(12) United States Patent
Mistry

(10) Patent No.: US 6,426,950 B1
(45) Date of Patent: Jul. 30, 2002

(54) METHOD OF RESOURCE MANAGEMENT AT COMPUTER CONTROLLED TELEPHONY HARDWARE

(75) Inventor: Dhansukh Nathubhai Mistry, Kanata (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/023,084

(22) Filed: Feb. 13, 1998

(51) Int. Cl.[7] .............................................. H04L 12/66
(52) U.S. Cl. ...................................... 370/352; 370/357
(58) Field of Search ................................. 370/351, 352, 370/353, 354, 355, 356, 463, 235, 252, 357, 358, 386; 379/88.17, 88.19, 900

(56) References Cited

U.S. PATENT DOCUMENTS

| | | | | |
|---|---|---|---|---|
| 5,610,910 A | * | 3/1997 | Focsaneanu et al. ........ | 370/351 |
| 5,617,471 A | | 4/1997 | Rogers et al. ............... | 379/212 |
| 5,751,802 A | * | 5/1998 | Carr et al. ................... | 379/201 |
| 6,049,602 A | * | 4/2000 | Foladare et al. ............ | 379/265 |
| 6,084,956 A | * | 7/2000 | Turner et al. ............... | 379/230 |
| 6,215,796 B1 | * | 4/2001 | Smith, Jr. .................... | 370/493 |

* cited by examiner

*Primary Examiner*—Wellington Chin
*Assistant Examiner*—Brenda H. Pham
(74) *Attorney, Agent, or Firm*—Max R. Wood; Swabey Ogilvy Renault

(57) ABSTRACT

A method of resource management at computer controlled telephony hardware outside the Public Switched Telephone Network (PSTN) operated by a service provider for establishing a call between a service subscriber and another party by facilitating a PSTN voice connection between the service subscriber and the computer controlled telephony hardware, and a PSTN voice connection between the other party and the computer controlled telephony hardware involves determining a resource management index associated with the service subscriber, determining a call treatment using the resource management index, and applying the call treatment to the call.

23 Claims, 4 Drawing Sheets

METHOD OF RESOURCE MANAGEMENT AT COMPUTER CONTROLLED TELEPHONY HARDWARE

RELATED APPLICATIONS

This application is related to United States patent applications entitled:

METHOD AND APPARATUS FOR ORIGINATING VOICE CALLS FROM A DATA NETWORK filed Oct. 10, 1997 and assigned Ser. No. 08/948,975;

METHOD AND SYSTEM FOR ACTIVITY-RESPONSIVE TELEMARKETING filed Dec. 24, 1997 and assigned Ser. No. 08/997,990; and METHOD AND SYSTEM FOR VOICE CALL COMPLETION USING INFORMATION RETRIEVED FROM AN OPEN APPLICATION ON A COMPUTING MACHINE filed Dec. 24, 1997 and assigned Ser. No. 08/997,989.

The specification of each of the above applications is incorporated herein by reference in its entirety.

TECHNICAL FIELD

The present invention relates generally to voice call completion using computer controlled telephony hardware which is outside the Public Switched Telephone Network (PSTN) and, in particular, to a method of resource management at computer controlled telephony hardware to reduce service costs and minimize PSTN link requirements.

BACKGROUND OF THE INVENTION

The importance of effective tools for business communication has long been recognized. Business communication tools for integrating business services and facilitating the dissemination of information through the Internet are described in applicant's co-pending related patent applications. These tools utilize computer controlled telephony hardware outside the Public Switched Telephone Network (PSTN) to facilitate establishment of calls between service subscribers and other parties. Calls may be completed by establishing a PSTN voice connection between the service subscriber and the computer controlled telephony hardware, and a PSTN voice connection between another party and the computer controlled telephony hardware. The two calls are then bridged together at the computer controlled telephony hardware. This use of computer controlled telephony hardware outside the PSTN enables a plurality of innovative services which improve and enhance business communications and promotion. The ready acceptance of these innovative services has demonstrated, however, that widespread deployment of these services can be expected.

While computer controlled telephony hardware used in this way provides ultimate control and flexibility in call handling, two trunk circuits are utilized for each call completed through the PSTN. Consequently, if both circuits are involved in long distance communications, two toll charges are incurred for the call. Likewise, the two circuits per -call place a burden on trunk facilities interconnecting the computer controlled telephony hardware and the PSTN. It is therefore desirable to provide a method of resource management at the computer controlled telephony hardware to provide a mechanism for controlling toll charges and for freeing resources on the facilities required to provide such services.

One way of reducing toll charges and freeing resources on service facilities is to transfer completed calls from the computer controlled telephony hardware to the PSTN. A method for effecting call transfers to the PSTN is described, for example, in U.S. Pat. No. 5,117,471 which issued Apr. 1, 1997 to Rogers et al. and is entitled TELECOMMUNICATIONS SYSTEM FOR TRANSFERRING A TELEPHONE CALL. Rogers et al describe a telecommunications system which provides a call transfer function while user-A is involved in two independent calls: one with user-B and one with user-C. The call transfer by user-A is initiated by sending a message to the long distance carrier switching office. In the switching office, both independent calls are identified as part of the transfer request. The switching office then requests the call transfer function by sending a message to a network control system for the validation of the transfer. After the network control system determines allowability of the transfer, the call between user-B and user-C is connected, while user-A and user-A's customer premise equipment is disconnected from user-B and user-C. While Rogers et al. provide a method useful for enabling a customer using a private branch exchange (PBX) or automatic call distributor (ACD) to transfer a call from one termination to another, no solution is taught for computer controlled telephony hardware where one or both connections are initiated by automated processes.

There therefore exists a need for a method of resource management at computer controlled telephony hardware outside the PSTN to permit service subscribers to manage resources in a convenient, parameter-driven way.

SUMMARY OF THE INVENTION

It is an object of the invention to provide a method of resource management at computer controlled telephony hardware to permit service subscribers to control call handling in accordance with their individual needs.

It is a further of the method in accordance with the invention to provide a method of resource management at computer controlled telephony hardware to permit service subscribers to automatically transfer calls from the computer controlled telephony hardware to the PSTN in order to reduce toll charges for toll calls.

It is a further object of the invention to provide a service subscriber with an option of determining on a call-by-call basis whether a call is to be transferred to the PSTN or bridged at the computer controlled telephony hardware in order to optimize call control.

These and other objects of the invention are realized in a method of resource management at computer controlled telephony hardware outside the Public Switched Telephone Network (PSTN) operated by a service provider for establishing a call between a service subscriber and another party by facilitating a PSTN voice connection between the service subscriber and the computer controlled telephony hardware, and a PSTN voice connection between the other party and the computer controlled telephony hardware, comprising:

determining a resource management index associated with the service subscriber;

determining a call treatment using the resource management index; and applying the call treatment to the call.

The method in accordance with the invention utilizes a resource management index associated with the service subscriber in order manage resources at computer controlled telephony hardware operated by a service provider. The resource management index may be a universal index which applies to all calls made by or received by the service subscriber. Alternatively, the resource management index may be associated with individual telephone numbers or Internet Protocol (IP) addresses, or some other set of identifiers associated with the subscriber to permit an ultimate flexibility in resource management.

In practicing the method in accordance with the invention, the resource management index is used to locate a rule in a rule base which stores a call treatment option. Call treatment options include, for example:

a) transfer all calls to the PSTN;

b) transfer all toll calls to the PSTN;

c) transfer no calls to the PSTN; and d) request instructions on a call-by-call basis to determine whether a call is to be transferred to the PSTN.

After a call treatment option is determined by the computer controlled telephony hardware, the call treatment is automatically applied to the call.

If a call is to be transferred to the PSTN, a transfer request message is sent from the computer controlled telephony hardware to a PSTN service switching point (SSP) which serves the computer controlled telephony hardware. The transfer request message includes call reference information relating to the call connection between the computer controlled telephony hardware and the respective voice connections with a service subscriber and the other party. The SSP returns a reply message accepting or denying the transfer request. In the event that the transfer is accepted, the SSP sends a disconnect message for each of the voice connections. The computer controlled telephony hardware responds to the disconnect messages by releasing the respective voice connections on receipt of the disconnect messages.

Transferring the voice connections from the computer controlled telephony hardware to the PSTN reduces toll charges for toll calls and reduces trunk resources connecting the computer controlled telephony hardware with the PSTN. Up to a 50% decrease in toll charges can be realized if all toll calls are transferred to the PSTN. Dedicated trunk resource requirements can be reduced by up to 80% when the methods in accordance with the invention are extensively used.

BRIEF DESCRIPTION OF THE DRAWINGS

The invention will now be explained by way of example only and with reference to the following drawings wherein.

DETAILED DESCRIPTION OF THE PREFERRED EMBODIMENT

Figure 1:
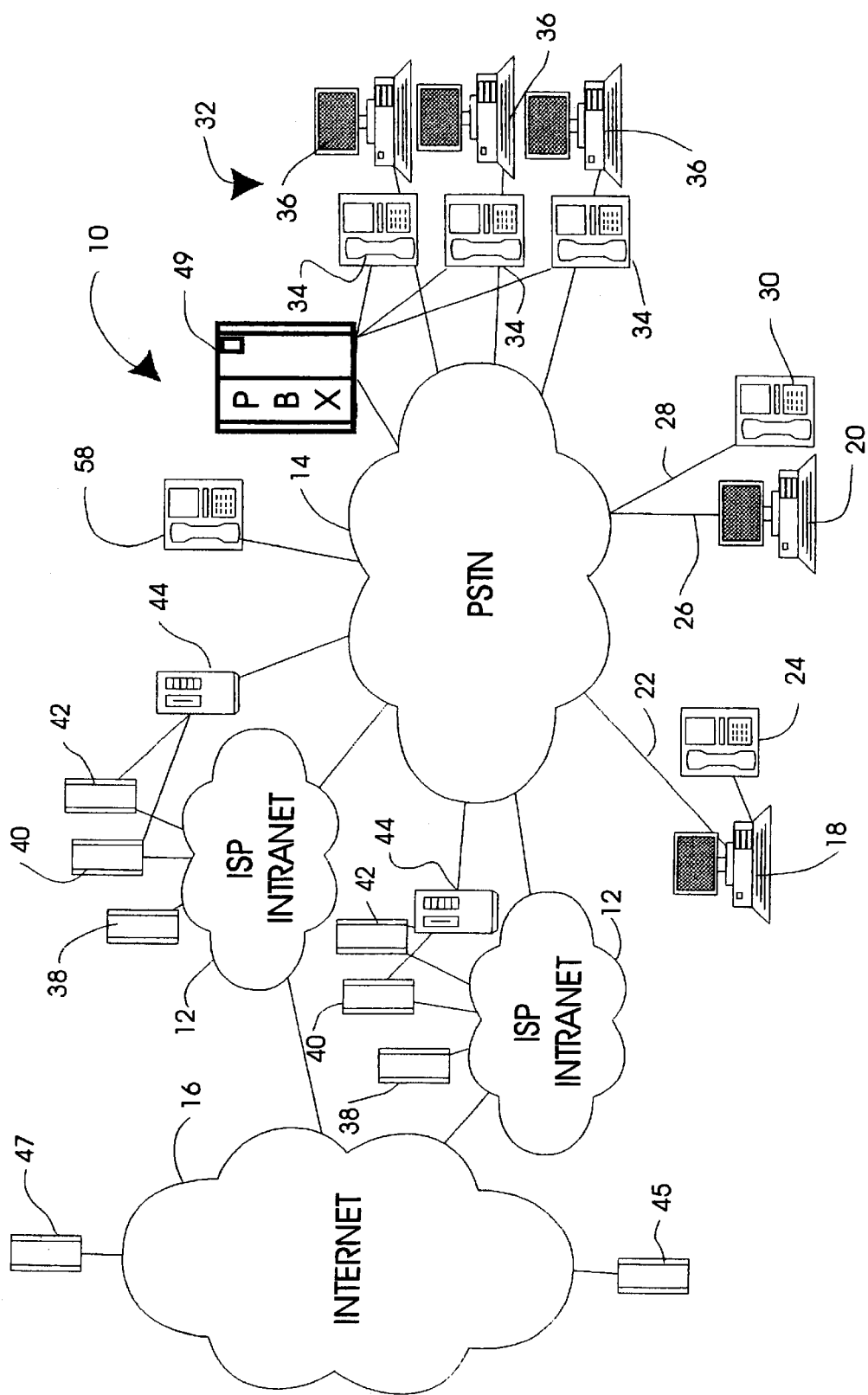
FIG. 1 is a schematic diagram of one potential configuration of equipment for performing the method of resource management in accordance with the invention.

This invention relates to a method of resource management at computer controlled telephony hardware outside the PSTN operated by a service provider for establishing a call between a service subscriber and another party by facilitating a PSTN voice connection between the service subscriber and the computer controlled telephony hardware, and a PSTN voice connection between the other party and the computer controlled telephony hardware. The method involves determining a resource management index associated with the service subscriber for each PSTN-PSTN call completion. The resource management index is used to determine a call treatment for respective PSTN-PSTN calls. The resource management index is preferably a subscriber defined parameter which determines how calls placed by the service subscriber, or calls received by the service subscriber, are to be treated.

Preferably, the service subscriber may apply any one of at least four call treatment options which include:

1) transferring all calls from the computer controlled telephony hardware to the PSTN;

2) transferring all toll calls to the PSTN;

3) transferring no calls to the PSTN; or 4) requesting transfer instructions on a call-by-call basis. This provides the service subscriber with a tool for minimizing toll charges for calls that require only the minimal flexibility in call handling provided by the PSTN. At the same time it permits the service subscriber to retain control of calls where call control is considered more important than call cost.

The resource management index may be a subscriber level index which applies to all calls for a given subscriber. More granularity may be achieved by permitting calls to, or from, specific numbers associated with a subscriber to be resource management indexes associated with a call treatment option. For service subscribers who use Automatic Call Distributors, for example, granularity may be achieved by permitting a called party's IP address to serve as a resource management index. Alternatively, a subscriber agent ID, or some other identifier, may be used as a resource management index to achieve a desired granularity of control.

For example, calls to a company's accounting department, or to technical support may rarely require transfer or conferencing. If a resource management index(es) associated with those terminations are set to option (1) so that all calls are automatically transferred to the PSTN, toll charges will be minimized and service resources freed up for more call handling. On the other hand, sales staff may require better call control to ensure that sales are closed. Calls to sales could therefore be assigned a resource management index (es) that would retain those calls at the computer controlled telephony hardware, or permit sales staff to decide on a call-by-call basis whether calls are to be transferred to the PSTN.

As another alternative, only toll calls may be transferred to the PSTN, thus reducing toll charges to a minimum while ensuring better control of local calls. Skillful use of the methods in accordance with the invention permits the desired level of call control granularity to be exercised.

TABLE 1

| Subscriber ID | Default T.O. | Telephone No. | T.O. | IP Address | T.O. |
|---|---|---|---|---|---|
| 3761 | 1 | 206-123-1234 | 1 | | |
| | | 206-123-1235 | 1 | | |
| | | 206-123-1236 | 4 | | |
| | | 206-123-1237 | 2 | | |
| 3840 | 2 | | | 121.232.242 | 2 |
| | | | | 121.232.258 | 4 |
| | | | | 121.232.289 | 1 |
| | | | | 121.232.296 | 2 |

TABLE 1-continued

| Subscriber ID | Default T.O. | Telephone No. | T.O. | IP Address | T.O. |
|---|---|---|---|---|---|
| 3961 | 1 | | | | |
| 3977 | 2 | 613-763-4141 | 1 | | |
| | | 613-763-4180 | 1 | | |
| | | 613-763-4182 | 2 | | |
| | | 613-763-4196 | 4 | | |
| | | 416-914-1221 | 4 | | |
| | | 416-914-1222 | 1 | | |
| | | 416-914-1223 | 1 | | |

Table 1 shows an exemplary format for a resource management index table in accordance with the invention. Other formats may be preferred and if properly structured would be equally operable. In Table 1, service subscribers are identified by a numeric subscriber ID. Assigned to each service subscriber is a default treatment option which is used to control calls if a resource management index of finer granularity is not located in the table. Entries in the resource management index table may be periodically, or dynamically maintained. For example, customer "3840" operates a small call centre service using an ACD. Agents served by the ACD are identified by IP address so that incoming calls can be distributed to agents and added to their incoming call queues using their current IP address. When agents begin a work session, they logon to the system which notifies the ACD and the service provider of their IP address. Equipment at the service provider is programmed to update the resource management index table with the IP address so that the table entries for subscriber "3840" are dynamically maintained. On the other hand, the telephone numbers for direct dial terminations for subscribers "3761" and "3977" are periodically maintained by the respective service subscribers or by a service administrator, since the telephone numbers are substantially static and not subject to frequent change.

As is apparent from Table 1, each entry in the table has an associated treatment option (T.O.) identified by a number which corresponds, for the sake of example, to the four treatment options described above. When a PSTN-PSTN call is set up, as will be explained below in more detail with reference to the examples shown in FIGS. 2–4, a query message sent to a database that stores the resource management index table shown in FIG. 1 includes the Subscriber ID, the telephone number of the subscriber termination, and an IP address, if available, or any other identifier used as a resource management index. A search algorithm is programmed to seek the finest granularity in the table. For example, if a call is received at "416-914-1221" of customer "3977", the treatment option returned from the database would be option 4. In other words, the called service subscriber would be requested to provide transfer instructions for the call. If, however, service subscriber "3961" receives a call to any number, the call will be automatically transferred to the PSTN because the only table entry for that subscriber is the default treatment option "1".

In order to illustrate the use of these methods of resource management, three examples of call processing involving the methods are described below, after an overview of an exemplary network for implementing the invention is described.

FIG. 1 shows a schematic diagram of a communications network, generally indicated by the reference 10, equipped with an apparatus suitable for implementing the methods in accordance with the invention. The apparatus is principally designed for use by a service provider such as an Internet Service Provider (ISP) 12. Each ISP 12 has an intranet that is connected to the PSTN 14 in a manner well known in the art. Each ISP 12 intranet is also connected to the Internet 16 in a manner well known in the art. Internet users such as clients 18 and 20 typically access their ISPs using dial-up connections through the PSTN 14. Alternatively, clients 18,20 may connect to their ISPs using cable modems (not illustrated) or the like. In some installations, a user may have only one dial-up connection. For example, client 18 has a single dial-up connection 22 which serves the dual function of data transfer for Internet sessions and voice transfer for telephone conversations using telephone 24. Client 20, on the other hand, has a dataline 26 for accessing the Internet and a telephone line 28 for voice communications using telephone 30.

A service subscriber generally indicated by reference 32 contracts an ISP 12 to provide one or more of the services described in applicant's co-pending patent applications described above. The service subscriber 32 is typically a business having one or more business telephones 34 and one or more computer workstations 36 connected directly or indirectly to the PSTN. The business telephones 34 may be, for example, connected to a Public Branch Exchange (PBX) 49. The service subscriber 32 may have an intranet (not illustrated). In addition, the telephones 34 accompanying the workstations 36 may be grouped in a single location or dispersed in different premises, different cities or even different countries. The methods in accordance with the invention do not require that equipment or personnel be co-located, as will be apparent to those skilled in the art.

The apparatus for performing the method in accordance with the invention is typically owned and operated by the ISP 12, although it may also be owned and operated by any other institution including a business having adequate demand for the services the apparatus enables. The apparatus for performing the method in accordance with the invention includes at least a web application server 38 and a computer telephony server (CTI server) 40, and CTI hardware 44. Typically, the apparatus would also include a VOIP gateway 42. Other equipment commonly provisioned at the ISP includes a billing server (not illustrated), an operations and maintenance server (not illustrated) and a database server 54 (see FIGS. 2–4). The operation and function of the hardware described above is thoroughly explained in applicant's co-pending patent applications incorporated herein by reference.

Figure 2:
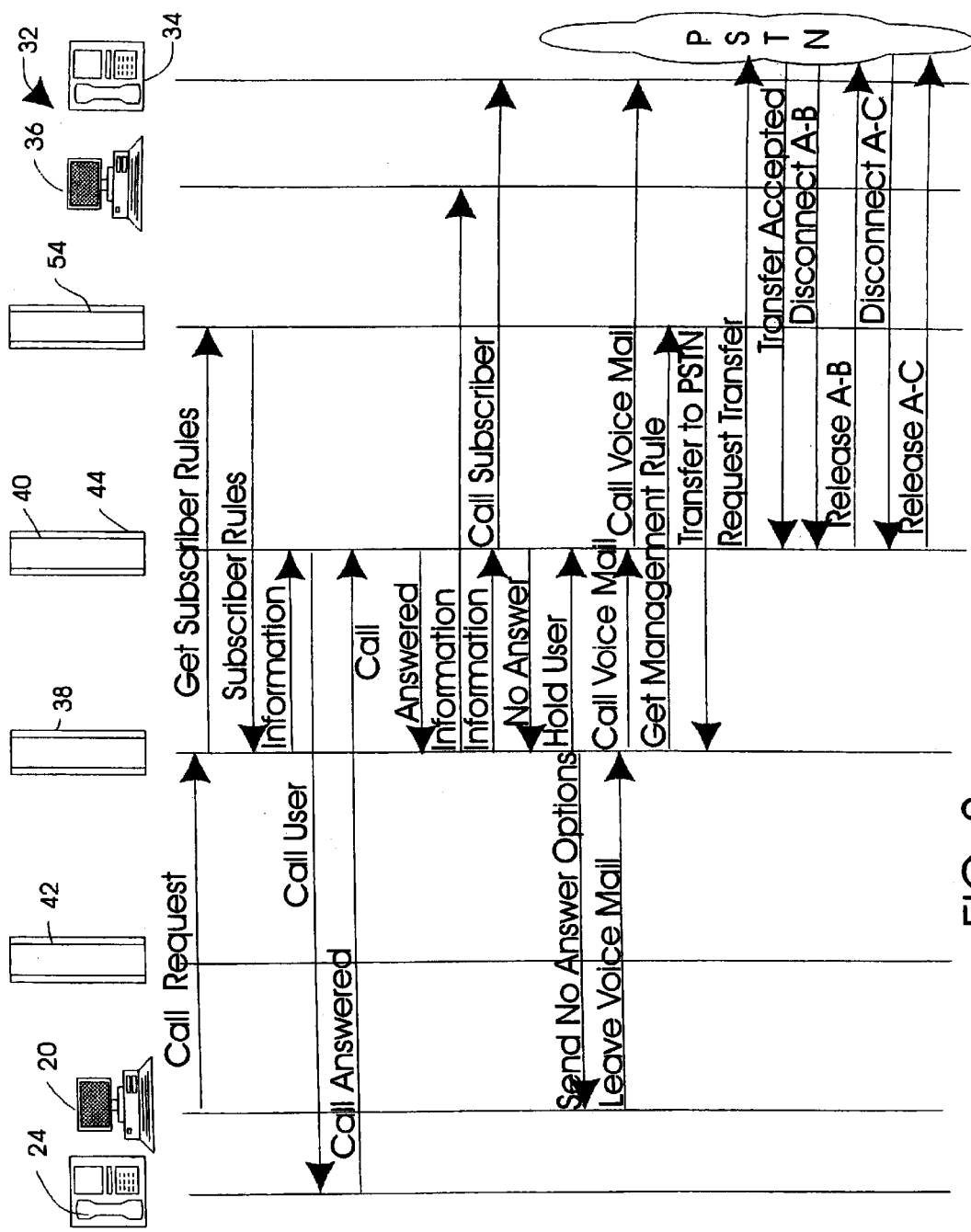
FIG. 2 is a schematic diagram of messages exchanged during call processing, wherein a call treatment is applied to PSTN calls using the method in accordance with the invention.

FIG. 2 is a simplified schematic diagram of call flow messages exemplary of a service described in applicant's co-pending patent application entitled METHOD AND APPARATUS FOR ORIGINATING VOICE CALLS FROM A DATA NETWORK. In this example, a user at workstation 20 browsing a page on the web application server 38 initiates a call request to his telephone 24 by activating a "voice button" on the web page. On receipt of the call request, the web application server 38 identifies the subscriber using information associated with the request and sends a query to the database server 54 requesting subscriber rules which determine how the call request is to be completed to the service subscriber 32. After the rules are returned to the web application server 38, the web application server 38 sends information to the CTI server 40 instructing the CTI server 40 to call user client 20 by placing a PSTN call to the telephone 24. The CTI server 40 informs the web application server 38 that the call is answered when the user client 20 answers the telephone 24. Call alert information is then sent by the web application server 38 to the subscriber workstation 36 as described above. Information obtained from the subscriber rules is sent to the CTI server 40 to instruct the CTI server 40 to call the service subscriber 32, unless the call alert was rejected at the subscriber workstation 36. In this example, the service subscriber 36 is unavailable to take the call and the call to the service subscriber 32 is not answered. After a predetermined time has elapsed, the CTI server 40 informs the web application server 38 that no answer has been received to the call to the service subscriber. The web application server 38 again consults the subscriber rules, and instructs the CTI server to hold the user while "no answer" options are presented to the user client 20. While the user is on hold, the CTI server 14 may be enabled to broadcast music or information to the subscriber telephone 24 in a manner well known in the art. The "no answer" options presented to the client 20 may, for example, include:

1) leave a text message;
2) leave a voice mail message;
3) call back at a specified time.

In this example, the user client 20 elects to leave a voice mail message and selects option 2. The option is sent to the web application server 38 which instructs the CTI server 40 to connect the user to the voice mail system of the server subscriber 32. Since a PSTN-PSTN call is now being established, the web application server 38 sends a query message to the database 54 to obtain a resource management rule respecting the customer's preferred treatment of PSTN-PSTN calls. The query message includes the service subscriber ID, the telephone number of the telephone 24 and the telephone number of the voice mail system. The database 54 returns a response that calls to the number associated with the voice mail system are to be transferred to the PSTN. The web application server 38 therefore instructs the CTI server 40 to request a transfer of the call to the PSTN. The CTI server 40 formulates a transfer request message and forwards it to a Service Switching Point (SSP) in the PSTN which services the CTI server 40. Preferably, the CTI server 40 is connected to the SSP (not illustrated) by one or more Private Rate Interface (PRI) trunks, and messaging between the CTI server 40 and the PSTN is accomplished using PRI messaging, which is well known in the art.

In this example, the SSP in the PSTN accepts the transfer. Processing by the SSP in the PSTN may be accomplished in accordance with methods described in U.S. Pat. No. 5,617, 471, or any other method for accomplishing the same purpose. Typically, the CTI server 40 formulates a facility message which includes at least the following parameters:

a) a call reference defining the call from the CTI hardware 44 to the subscriber (in this case the voice mail system); and b) a facility command to invoke explicit transfer (FAC IE) which includes a link ID that defines the call from the CTI hardware 44 to the user telephone 24.

The SSP responds with a facility message accepting or rejecting the transfer. If the SSP accepts the transfer, it returns PRI commands to the disconnect the A-B connection (CTI hardware 44 to voice mail system). The CTI server 40 responds with a message indicating to the SSP that call A-B has been released. The SSP responds to the release (REL) message with a Release Complete (RLC) acknowledgement (not illustrated). The SSP then sends a PRI command to the CTI server 40 to disconnect the A-C call connection (CTI hardware 44 to telephone 24) and the CTI server 40 responds with release A-C message, which is replied to with a release-complete acknowledgement from the SSP (not illustrated).

Figure 3:
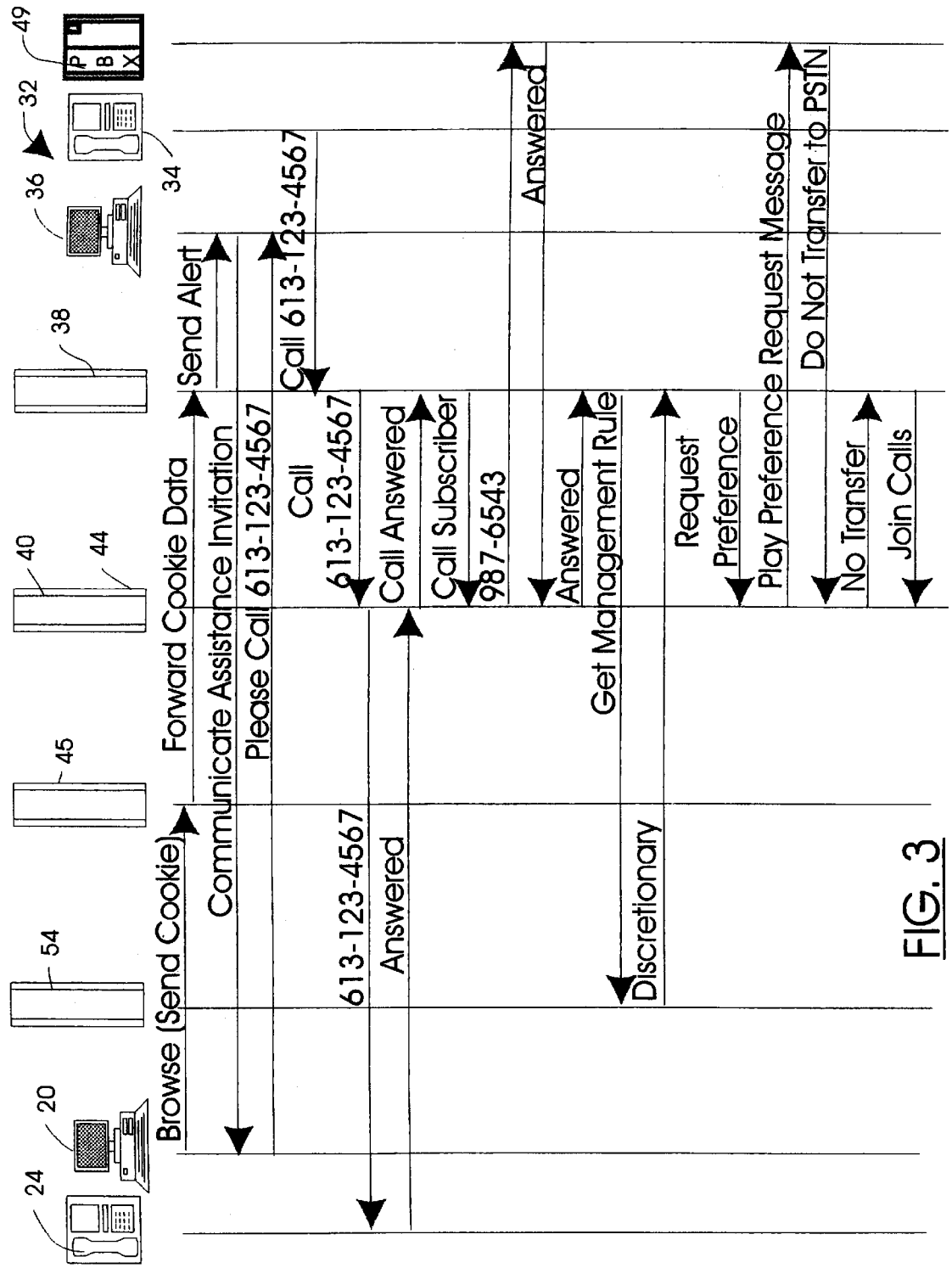
FIG. 3 is a schematic diagram of messages exchanged during call processing, illustrating a further application of the method in accordance with the invention.

FIG. 3 schematically illustrates a simplified message flow in a call sequence which may occur using the methods and apparatus described in applicant's co-pending patent application entitled METHOD AND SYSTEM FOR ACTIVITY-RESPONSIVE TELEMARKETING. In the call sequence shown in FIG. 3, a potential customer accesses a public web server 45 using PC 20. The potential customer's Internet browser forwards a cookie which was previously created by the public web server 45 and stored on the hard disk of the PC 20 earlier in the current session or during a prior session. On receipt of the cookie, a monitoring function of the public web server 45 extracts the cookie data and forwards the cookie data to the telemarketing analysis server 38 which analyzes the cookie data and determines that the potential customer using the PC 20 has, for example, visited the public web server 45 twice in the last two days.

An activity analysis function on the web application server 38 is configured to determine that an alert should be sent to a telemarketing agent's PC 36 when a potential customer visits the public web server 45 twice in one week. On determining that the potential customer using PC 20 meets the predetermined criteria respecting activity of the potential customer, the telemarketing analysis server 38 prepares an alert message which is forwarded over the Internet to the telemarketer's PC 36. The alert message is displayed as a "screen pop" or is added to a queue on the telemarketer's PC 36. On receipt of the alert message, the telemarketer responds with an assistance invitation to the potential customer 20. The assistance invitation may be, for example, a pop-up text window having a prepared text in a form which permits the potential customer to respond with a preference as to how they would like to be served by the telemarketer 32.

In this example, on receipt of the assistant's invitation, the potential customer at PC 20 decides that he would like to speak to a telemarketing agent in response to the request that the agent please call at the number of his telephone 24. Because of space limitations, the call request is being shown as if it were passed directly from PC 22 to PC 36. It actual practice, the call request is received by the public web server 45, forwarded to the web application server 38 and on to the telemarketer's PC 36 where it appears in a pop-up window. In response, the telemarketer at PC 36 accepts the call request. The web application server 38 instructs the CTI server 40 to call the telephone 24. The CTI server 40 commands the CTI hardware 44 to dial the number of telephone 24. When the call is answered, the CTI server 40 informs the web application server 38 that the call has been answered and the web application server 38 responds by instructing the CTI server to call the subscriber which dials a number provided by the web application server 38, in this example, a number associated with the PBX 49. When the telemarketing agent answers the telephone 34, the PBX 49 responds with an answer message to the CTI server 40 which informs the web application server 38 that the call to the subscriber has been answered.

The web application server 38 recognizes that a PSTN-PSTN call has been set up and responds by sending a query message to database 54 to get a resource management rule associated with the subscriber. The query message preferably includes the service subscriber ID, the telephone number of telephone 34, and the IP address of PC 36 to permit a call treatment option indicated by the resource management index of finest granularity to be located. As described above, the resource management rule may be a general rule associated with the subscriber ID or a rule of finer granularity associated with the service subscriber telephone number dialed or an IP address of the service subscriber. In this example, the database 54 returns a message indicating that the service subscriber call treatment option indicates that the service subscriber has the discretion to decide how the call is to be managed. Consequently, the web application server 38 instructs the CTI server 40 to play a preference request message to the service subscriber at telephone 34. The preference request message preferably provides the service subscriber with at least the called number and, if available, the name of the party calling, although that information may already be displayed on the PC 36. The preference request message requests that the service subscriber provide instructions indicating whether the call is to be transferred to the PSTN or bridged at the CTI hardware 44 in order to maintain more flexibility in call handling. In this example, the telemarketing agent using telephone 34 recognizes that the call is from a customer who is likely to require more information than the agent is personally able to provide. The agent therefore instructs the CTI server 40 that the call is not to be transferred to the PSTN. The instructions may be passed to the CTI server 40 by voice recognition, DMTF tones, or an equivalent mechanism. Alternatively, the information could be passed through the PC 36 to the web application server 38, though the more generic PSTN path is preferred. On receipt of the instructions, the CTI server 40 passes a message back to the web application server 38 that the call is not to be transferred and the web application server 38 instructs the CTI server to join the calls at the CTI hardware 44. Thereafter, the call progresses as normal and the telemarketing agent at telephone 34 has control to permit the call to be transferred, or to conference in other parties, as desired.

Figure 4:
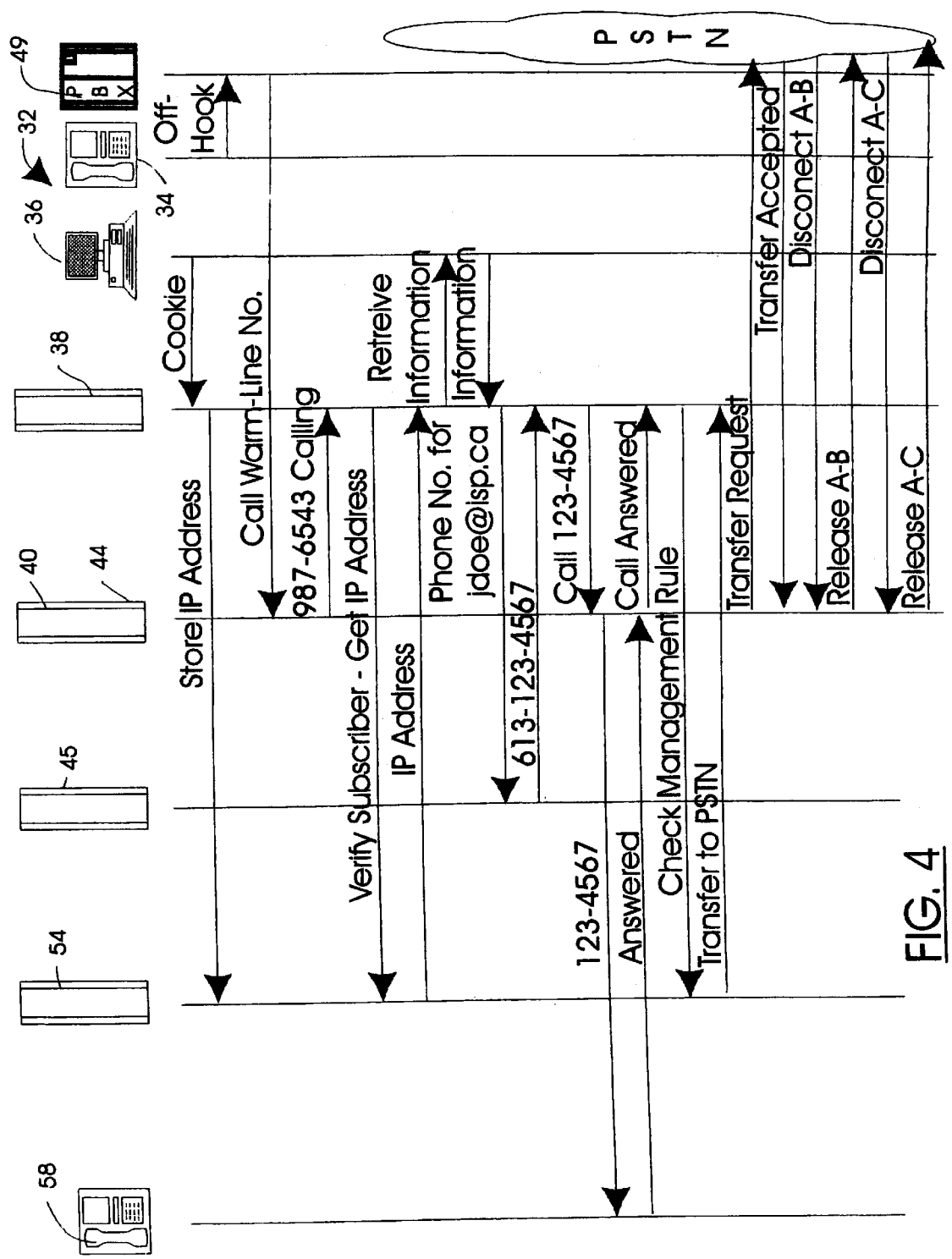
FIG. 4 is a schematic diagram illustrating yet a further application of the method in accordance with the invention.

FIG. 4 shows yet a further example of an application of the method in accordance with the invention using methods and equipment described in applicant's co-pending patent application entitled METHOD AND SYSTEM FOR VOICE CALL COMPLETION USING INFORMATION RETRIEVED FROM AN OPEN APPLICATION ON A COMPUTING MACHINE. In this example, a service subscriber 32 initiates a web session which causes the subscriber's PC 36 to forward a "cookie" to the web application server 38. On receipt of the cookie, the web application server 38 stores the current IP address of the service subscriber 32 in the database server 54 for later use. After initiating the data session, the service subscriber 32 receives an electronic mail message (not illustrated) which is displayed on the PC 36. When the subscriber 32 has finished reading the message, the subscriber 32 decides that he would like to speak in person with the sender of the electronic mail message. In order to automatically accomplish this, the service subscriber 32 takes the telephone 34 off-hook. The off-hook condition is recognized by the PBX 49. The PBX 49 is programmed to automatically dial a number (commonly referred to as a "warm-line" number) assigned to the CTI hardware 44 of the CTI server 40 if no digits are dialed before a predetermined time has elapsed. The PBX 49 therefore dials the "warm-line" number and the user is connected to the CTI server 40. On receipt of the call, the CTI server 40 extracts the telephone number of telephone 34. The telephone number may be supplied, for example, by the telephone service provider as a calling line identification (CLID) service. The CTI server 40 passes the telephone number of the subscriber in a message to the web application server 38. The web application server 38 uses the telephone number of the subscriber to locate the subscriber service record. In this example, the subscriber service record is stored in the database 54. The subscriber service record is located in a table lookup. If the telephone number received from the CTI server is not matched in the subscriber service record, an error message is played to the caller and the call is disconnected.

The telephone number identifies the subscriber 32 and is used to retrieve the current IP address of the subscriber 32 from the database server 54. The web application server 38 formulates a data message addressed to the IP address of PC 36. The web application server 38 transmits the data message into the Internet. The data message requests that information be retrieved from an open warm-line enabled application on the PC 36. The message is received by a warm-line function operative on the PC 36. The warm-line function searches for an open warm-line enabled application on PC 36, as described in applicant's co-pending patent application.

In this example, the information returned by the query is an electronic mail address for "jdoe@isp.ca". The web application server 38 analyzes the information and determines that it does not conform to any known dialing plan. It also determines that the information includes an "@" character and therefore appears to be an electronic mail address. Web application server 38 therefore prepares a query message which it addresses to a directory server 45 for translating the electronic mail address to a telephone number. The directory server 45 receives the query and returns to the web application server 38 the telephone number associated with the electronic mail address. The web application server 38 instructs the CTI server 40 to call the retrieved number. In this example, the user at telephone 58 is available and answers the call. When the call is answered, the CTI server 40 instructs the web application server 38 that the call has been answered, which prompts the web application server 38 to query the database 54 for a call treatment option for the PSTN-PSTN call. The call treatment option returned in response to the query instructs the web application server 38 that the call is to be transferred to the PSTN. The web application server 38 instructs the CTI server 40 to transfer the call and a transfer sequence proceeds as described above.

In the transfer sequence, the CTI server 40 sends a transfer request (not shown) to an SSP in the PSTN which serves the CTI server. The SSP responds with a transfer accepted message and thereafter instructs the CTI server to disconnect the calls A-B, A-C. The CTI server 40 responds with a release message for each of the calls and the call is transferred to the SSP and bridged so that telephone 34 is connected through the SSP directly to telephone 58, thereby minimizing toll charges and freeing resources used in the PRI trunk which connects the CTI server 40 to the SSP.

As will be understood by those skilled in the art, the methods in accordance with the invention permit service subscribers to control their toll call charges. In order to encourage efficient use of resources, a service provider may also set a universal default rule which transfers all calls to the PSTN for which no service subscriber resource management index exists or applies. The methods in accordance with the invention therefore provide a powerful tool for resource management at CTI hardware facilities and enable service subscribers to exercise flexible resource management control over their calls.

Changes and modifications to the embodiments of the invention described will no doubt become apparent to those skilled in the art. The scope of the invention is therefore intended to be limited solely by the scope of the appended claims.

I claim:

1. A method of resource management at computer controlled telephony hardware outside the Public Switched Telephone Network (PSTN) operated by a service provider for establishing a PSTN-PSTN call between a service subscriber and another party by facilitating a PSTN voice connection between the service subscriber and the computer controlled telephony hardware, and a PSTN voice connection between the other party and the computer controlled telephony hardware, comprising:

determining a resource management index associated with the service subscriber for the PSTN-PSTN call, after both of the voice connections have been answered;

determining a call treatment using the resource management index; and applying the call treatment to the PSTN-PSTN call.

2. A method as claimed in claim 1 wherein the resource management index is a telephone number associated with telephone equipment used to establish the PSTN voice connection with the service subscriber.

3. A method as claimed in claim 2 wherein the call treatment is determined using a rule base which stores a call treatment option for each telephone number associated with a service subscriber.

4. A method as claimed in claim 3 wherein call treatment options include:
a) transfer all calls to the PSTN;
b) transfer all toll calls to the PSTN;
c) transfer no calls to the PSTN; and
d) request instructions from the subscriber on a call-by-call basis to determine whether a call is to be transferred to the PSTN.

5. A method as claimed in claim 1 wherein the resource management index is an IP address associated with computer equipment used by the subscriber to establish a data connection with computer equipment of the service provider.

6. A method as claimed in claim 5 wherein the call treatment is determined using a rule base, which stores a call treatment option for each IP address associated with a service subscriber.

7. A method as claimed in claim 6 wherein call treatment options include:
a) transfer all calls to the PSTN;
b) transfer all toll calls to the PSTN;
c) transfer no calls to the PSTN; and
d) request instructions from the subscriber on a call-by-call basis to determine whether a call is to be transferred to the PSTN.

8. A method as claimed in claim 4 wherein the computer controlled telephony hardware is connected to the PSTN by one or more Private Rate Interface (PRI) trunks and the transfer of the PSTN-PSTN call to the PSTN is accomplished using PRI messages sent to a Service Switching Point (SSP) that serves the computer controlled telephony hardware.

9. A method as claimed in claim 1 wherein the PSTN-PSTN call is initiated by the other party, who initiates a call request from a data network.

10. A method as claimed in claim 9 wherein the data network is the Internet and the PSTN-PSTN call is initiated from a World Wide Web page on the Internet.

11. A method of resource management at computer controlled telephony hardware outside the Public Switched Telephone Network (PSTN) operated by a service provider for establishing a PSTN-PSTN call between a service subscriber and another party by facilitating a PSTN voice connection between the service subscriber and the computer controlled telephony hardware, and a PSTN voice connection between the other party and the computer controlled telephony hardware, comprising:

monitoring the establishment of a PSTN voice connection between the service subscriber and the computer controlled telephony hardware, and between the other party and the computer controlled telephony hardware to determine when both PSTN voice connections have been answered;

locating a resource management index associated with the service subscriber after both of the PSTN voice connections have been answered;

retrieving a predefined call treatment option using the resource management index in a table lookup; and applying the call treatment to the PSTN-PSTN call.

12. A method as claimed in claim 11 wherein applying the call treatment of the PSTN-PSTN call involves transferring each of the voice connections to the PSTN to form a single voice connection between the service subscriber and the other party.

13. A method as claimed in claim 11 wherein applying the call treatment to the PSTN-PSTN call involves bridging the PSTN voice connections at the computer controlled telephony hardware to enable conversation between the service subscriber and the other party.

14. A method as claimed in claim 11 wherein applying the call treatment to the PSTN-PSTN call involves requesting from the service subscriber how the call should be handled and either transferring the call to the PSTN or bridging the two PSTN voice connections at the computer controlled telephony hardware, as indicated by the service subscriber in response to the request.

15. A method as claimed in claim 11 wherein the PSTN voice connection between the computer controlled telephony hardware and the other party, is initiated by the other party who requests voice communications with the service subscriber using facilities provided by the service provider at a public page on a data network, and the PSTN voice connection is established by the computer controlled telephony hardware, which dials a telephone number supplied by the other party.

16. A method as claimed in claim 15 wherein the PSTN voice connection between the service subscriber and the computer controlled telephony hardware is established by the computer controlled telephony hardware, which dials a number located in a rule base associated with a service record for the service subscriber.

17. A method as claimed in claim 11 wherein the PSTN voice connection between the service subscriber and the computer controlled telephony hardware is established by the service subscriber using a warm-line function which causes the service subscriber's telephone equipment to dial a number associated with the computer controlled telephony hardware.

18. A method as claimed in claim 17 wherein the PSTN voice connection between the other party and the computer controlled telephony hardware is initiated by a retrieval of data from a computing machine associated with the service subscriber and established by the computer controlled telephony hardware using the data or a telephone number retrieved using the data as an index to locate the telephone number in a directory.

19. A method as claimed in claim 12 wherein the transferring comprises:

sending a transfer request message from the computer controlled telephony hardware to a PSTN service switching point (SSP) that serves the computer controlled telephony hardware, the transfer request message including reference information relating to each of the PSTN voice connections;

receiving from the SSP a reply message accepting or denying the transfer request;

in the event that the transfer is accepted, receiving from the SSP a disconnect message for each of the PSTN voice connections; and releasing the respective PSTN voice connections at the computer controlled telephony hardware on receipt of the disconnect messages.

20. A method of resource management at computer controlled telephony hardware as claimed in claim 19 wherein the computer controlled telephony hardware is connected to the PSTN by a Private Rate Interface (PRI) trunk and messages exchanged between the computer controlled telephony hardware and the SSP are in PRI format.

21. A method of resource management at computer controlled telephony hardware as claimed in claim 20 wherein the transfer request message includes an invoke transfer request, a call reference and a call link identification.

22. A method as claimed in claim 21 wherein the call reference identifies the PSTN voice connection between the computer controlled telephony hardware and the service subscriber, and the call link identification identifies the PSTN voice connection between the computer controlled telephony hardware and the other party.

23. A method as claimed in claim 19 wherein charges for the single voice connection are billed to the service subscriber.

* * * * *